US006840113B2

(12) United States Patent
Fukumura et al.

(10) Patent No.: US 6,840,113 B2
(45) Date of Patent: Jan. 11, 2005

(54) PINCH DETECTION SYSTEM

(75) Inventors: Tomohiro Fukumura, Rochester Hills, MI (US); Brian J. Marlett, Shelby Township, MI (US); Sanjaya Kumar Dash, Rochester Hills, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 174 days.

(21) Appl. No.: 10/243,306

(22) Filed: Sep. 13, 2002

(65) Prior Publication Data

US 2003/0051555 A1 Mar. 20, 2003

Related U.S. Application Data

(60) Provisional application No. 60/318,923, filed on Sep. 13, 2001, and provisional application No. 60/402,719, filed on Aug. 12, 2002.

(51) Int. Cl.$^{7}$ .................................................. G01N 3/00

(52) U.S. Cl. ........................... 73/760; 73/761; 318/469; 318/476

(58) Field of Search ............ 73/760, 761; 318/469–476

(56) References Cited

U.S. PATENT DOCUMENTS 5,399,950 A 3/1995 Lu et al.
5,436,539 A * 7/1995 Wrenbeck et al. .......... 318/265
5,530,329 A * 6/1996 Shigematsu et al. ........ 318/469
6,183,040 B1 * 2/2001 Imaizumi et al. ........... 296/155
6,408,238 B1 * 6/2002 Lamm et al. ................. 701/49
6,573,677 B2 * 6/2003 Gerbetz ...................... 318/445

FOREIGN PATENT DOCUMENTS

EP 0590227 A 4/1994
EP 0945953 A 9/1999

OTHER PUBLICATIONS

International Search Report, dated Dec. 11, 2002.

* cited by examiner

*Primary Examiner*—Edward Lefkowitz
*Assistant Examiner*—Alandra Ellington

(57) ABSTRACT

A pinch detection system and method controls the speed of a motor moving an object by first calculating the actual motor force and then comparing the actual motor force with a reference force value in a reference field. A pinch condition is indicated if the difference between the actual force and the reference force exceeds a selected pinch threshold. The difference is also used to update the reference field, the pinch threshold and the desired speed of the motor so that the reference field will eventually reflect the actual force profile of the object. The updated pinch threshold is also used to control the motor speed so that the pinching force remains constant regardless of the pinch threshold value.

23 Claims, 3 Drawing Sheets

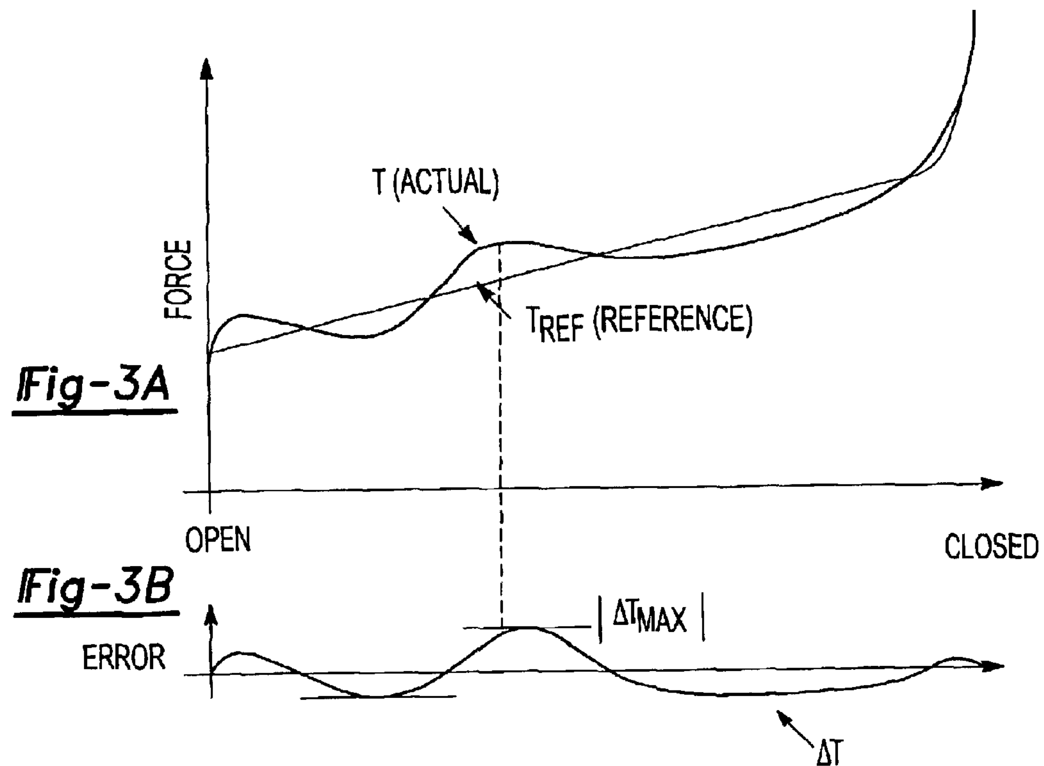
Fig-3A
Fig-3B
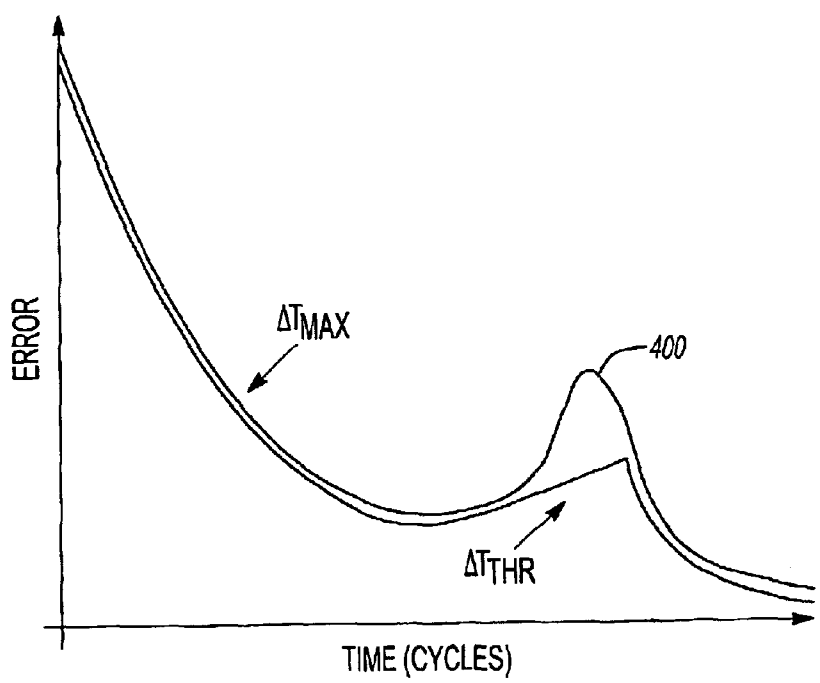
Fig-4

PINCH DETECTION SYSTEM

REFERENCE TO RELATED APPLICATIONS

This application claims the benefit of U.S. Provisional Appln. No. 60/318,923, filed Sep. 13, 2001, and U.S. Provisional Appln. No. 60/402,719, filed Aug. 12, 2002, the disclosures of which are incorporated herein by reference.

TECHNICAL FIELD

The present invention is directed to a control system for a power-operated moving object, such as a vehicle window more particularly to a control system that detects a possible pinch condition in the moving object.

BACKGROUND OF THE INVENTION

Systems for moving objects (e.g., sliding vehicle doors, lift gates, trunks, windows, and the like) often incorporate a pinch detection system that detects when a obstacle is in the path of the moving object. Currently known systems compare the motor force or torque with a reference force or torque and determines that a pinch condition exists if the actual force is greater than the reference force by a certain amount.

The reference force used to detect the pinch condition is normally obtained from a reference field that ideally represents the force profile of the moving object. Customizing the force profile for each individual object is time-consuming and costly, so some current systems use a pre-determined reference field that is obtained from a theoretical design value or a pre-calculated average of force profiles from several samples. Even with these calculations, manufacturing variances from object to object will create inevitable errors between the predetermined reference field and the actual force profile of the object. These variations require the pinch detection threshold to be increased to avoid false detection of pinch conditions, but increasing the pinch threshold undesirably increases the pinching force as well. Further, if the reference field collapses or is unavailable for any reason, pinch detection in current systems is rendered impossible.

There is desire for a system that can adapt to different force profiles to optimize pinch detection for a given moving object without obtaining force profiles of each sample. There is also a desire for a system that can keep pinching force constant regardless of the pinch detection threshold value.

SUMMARY OF THE INVENTION

The present invention is directed to a system and method for pinch detection. The invention controls the speed of a motor moving the object by first calculating the actual motor force and then comparing the actual motor force with a reference force value in a reference field. A pinch condition is indicated if the difference between the actual force and the reference force exceeds a selected pinch threshold. The difference is also used to update the reference field so that the reference field will eventually reflect the actual force profile of the object even as the profile changes due to age and wear. The difference is also used to update the pinch threshold to minimize pinch force while preventing false motor reversals. The updated pinch threshold also causes the desired speed of the motor, and therefore the object, so that the pinch force in the system will be kept constant. In one embodiment, initial values for the reference field, pinch threshold and desired speed are stored so that they can be used for pinch detection if the updated values are lost or otherwise unavailable.

By updating the reference value and based on the actual force characteristics of the moving object and changing the pinch threshold based on the reference value, the inventive system ensures accurate pinch detection even when there are manufacturing variances between systems. Further, updating the pinch threshold allows the pinching force to remain constant regardless of the pinch threshold value.

BRIEF DESCRIPTION OF THE DRAWINGS

FIGS. 3*a* and 3*b* are graphs illustrating a comparison between an actual force profile and a reference force profile along with an associated difference value profile according to one embodiment of the invention; and FIG. 4 is a graph illustrating a relationship between a maximum difference value and an additional threshold value based on the maximum error value.

DETAILED DESCRIPTION OF THE EMBODIMENTS

Figure 1:
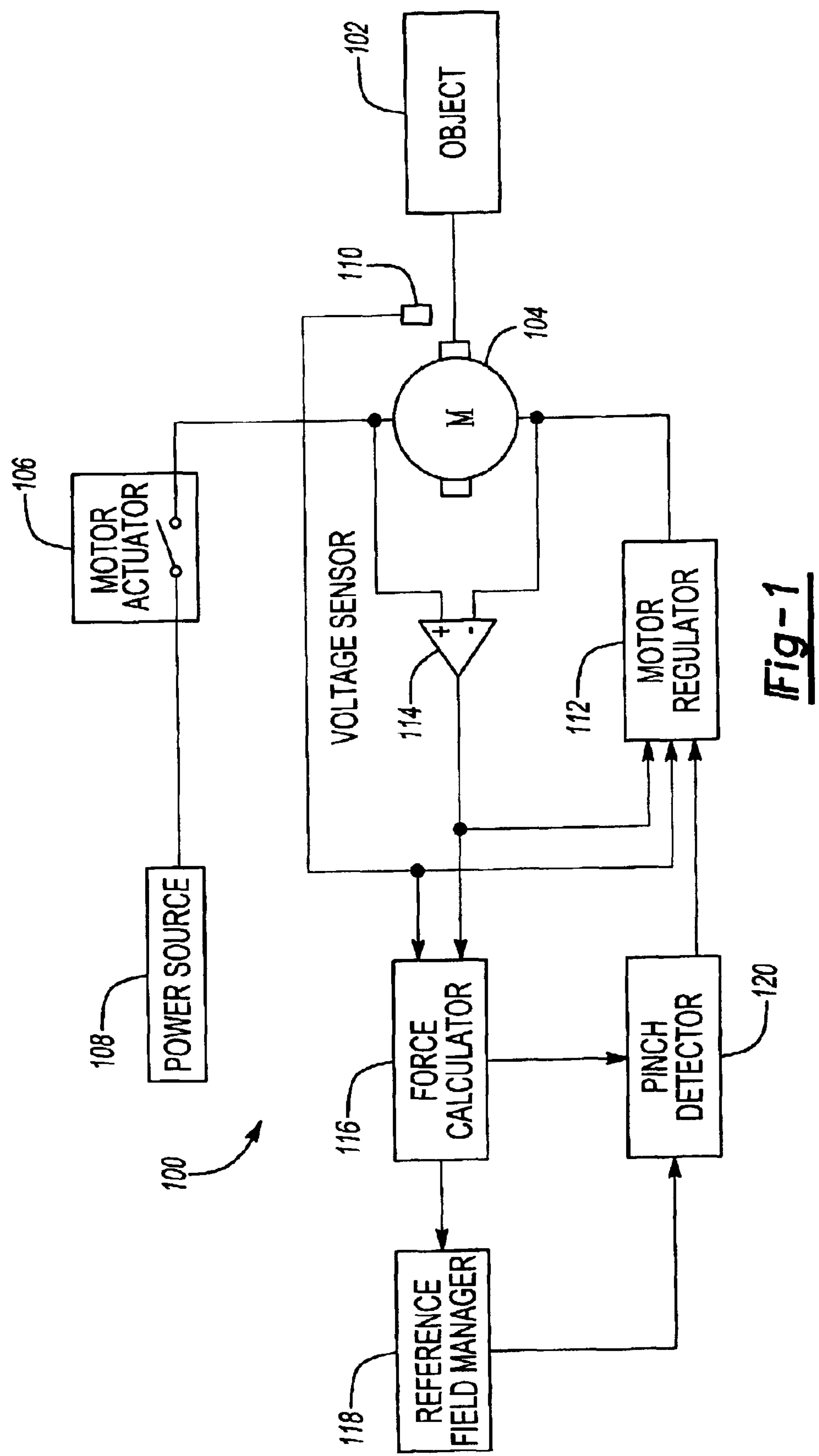
FIG. 1 is a schematic diagram of a pinch detection system according to one embodiment of the invention.

FIG. 1 is a schematic diagram illustrating a pinch detection system 100 according to one embodiment of the invention. The system 100 controls power movement of an object 102, such as a vehicle window, vehicle door, trunk, lift gate, sliding door, etc. Although the example shown in the figures and described below focuses on moving a vehicle component, the object 102 moved by the system 100 can be any object 102 movable by a motor.

The system 100 includes a motor 104 that is actuatable by a motor actuator 106, such as a bi-directional relay, H-bridge power transistor or other actuation device. The motor actuator connects and disconnects the motor 104 to and from a power source 108. A speed sensor 110 detects the rotational speed of the motor 104. The speed sensor 110 can be any type of speed sensor appropriate for monitoring the speed of the motor 104, such as an encoder, Hall effect sensor, or other type of sensor. In one embodiment, the speed sensor 110 sends an output to a motor regulator 112 to control the motor speed.

A voltage sensor 114 measures the voltage across the motor 104 and sends this information to the motor regulator 112 as well. The voltage sensor 114 also sends its output to a force calculator 116, which calculates the motor force (e.g., motor torque) according to the equation:

$$T = k_m \frac{V - k_n \omega}{R} \quad (1)$$

where V is the motor voltage sensed by the voltage sensor 114, R is the motor resistance, and $k_m$ and $k_n$ are motor constants associated with the motor 104.

The force calculator 116 sends an output to a reference field manager 118. The reference field manager 118 reflects an expected motor force at each object 102 position, as shown in FIG. 3*a*. In one embodiment, the reference field manager 118 is initialized with pre-determined reference force values. These pre-determined reference force values can be modified to reflect the actual force profile of a particular moving object, as will be explained in greater detail below.

A pinch detector 120 receives inputs from the force calculator 116 and the reference field 118 and determines whether a pinch condition exists based on the two received inputs. The pinch detector 120 detects a pinching condition if the actual force calculated by the force calculator 116 is greater by a selected pinch detection threshold value $T_{thr}$ than the corresponding reference force from the reference field 118. The corresponding reference force is, for example, the reference force value in the reference field corresponding to the object's position at a given time. In one embodiment, the pinch detector 120 sets a pinch detection flag (not shown). In other words:

$$\Delta T = T - T_{ref}[k] \tag{2}$$

$$f_{pinch} = \left\{ \frac{\text{true if } (\Delta T \geq T_{thr})}{\text{false otherwise}} \right\} \tag{3}$$

where $f_{pinch}$ is the pinch detection flag and $T_{ref}[k]$ is the reference force value at a given object position k. The pinch detector 120 can be any device, such as a microprocessor, that can conduct calculations and store updated pinch threshold values for determining pinch conditions.

The pinch detector 120 sends the pinch detection threshold value $T_{thr}$ to the motor regulator 112 so that the motor regulator 112 can adjust the desired motor speed ω based on the pinch detection threshold value $T_{thr}$. In one embodiment, the motor regulator 112 controls the motor speed by adjusting the voltage applied to the motor 104 according to any control method such as, for example:

$$V_{mot}^* = k_m \omega - Kp(\omega - \omega^*) \tag{4}$$

where ω* is the desired motor speed, $V_{mot}^*$ is the voltage to be applied to the motor, and $K_p$ is the feedback gain. Of course, any other control method may be used to regulate the motor speed. Regardless of the specific motor regulation method, the desired motor speed ω* is determined and updated based on the pinch detection threshold $T_{thr}$, which will be explained in greater detail below. The motor regulator 112 also will stop and reverse the motor 104 if the pinch detecting flag $f_{pinch}$ is set by the pinch detector 120.

Figure 2:
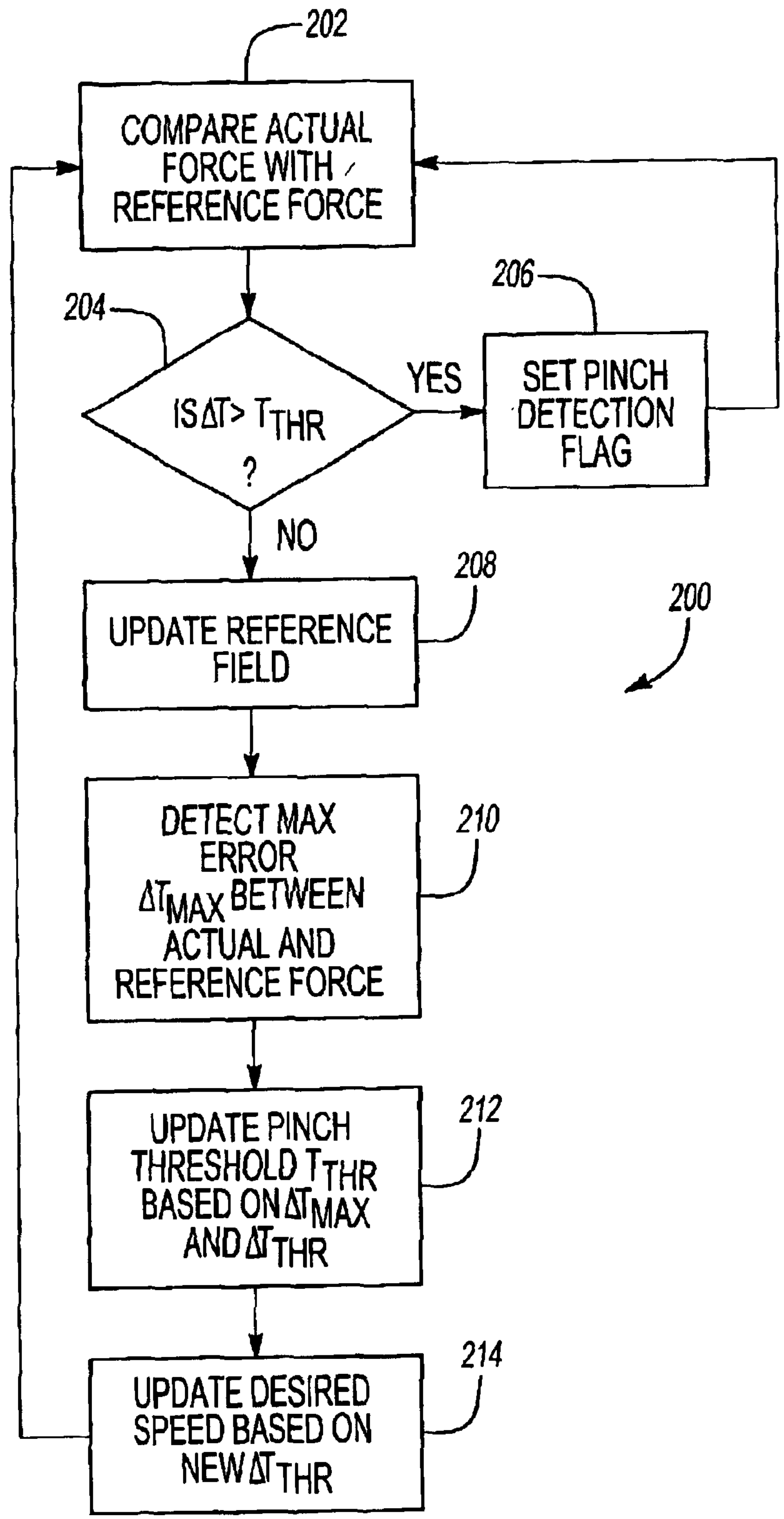
FIG. 2 is a flow diagram illustrating a process for pinch detection according to one embodiment of the invention.

FIG. 2 illustrates one method 200 in which the system of FIG. 1 detects a pinch condition. As noted above, the pinch detector 120 compares the actual motor force T from the force calculator 116 with the reference force $T_{ref}$ corresponding to the object's position from the reference field 118 (block 202). If the difference ΔT between the two forces is greater than pinch threshold value $T_{thr}$ (block 204), then the pinch detector 120 sets the pinch detection flag (block 206), notifying the motor regulator 112 of the pinch condition.

If the difference ΔT is less than the pinch detection threshold $T_{thr}$, it indicates that the object 102 successfully moved its full distance (e.g., a window or door moving to a closed position) without encountering any obstacles that would cause a pinch condition. The reference field is therefore updated (block 208) according to the equation:

$$T_{ref} = T_{ref}[k] + \alpha \Delta T[k] \tag{5}$$

where α is a selected "forgetting factor" between 0 and 1 and k is an integer value representing an object position. The value for α can be varied depending on how quickly the system wishes to disregard old data. As can be seen in Equation 5, the updated reference field value is proportional to the difference ΔT between the actual force and the reference force so that the reference can be updated quickly. Large differences will cause faster updates to the reference field 118. A small difference value ΔT indicates that the reference force $T_{ref}$ value is close to the actual force T value, making large changes unnecessary when the reference field 118 is updated (block 208). Updating the reference field in this manner ensures that the reference field will quickly match the actual force profile of the object 102.

When the reference field 118 is updated (block 208), the pinch detection $T_{thr}$ threshold is also updated by first determining the maximum difference ΔT between the actual force T and the reference force $T_{ref}$ along the entire movement of the object 102 (block 210). As shown in FIG. 3*a*, the actual force T may be higher than the reference force $T_{ref}$ at some positions along the object's travel path and be lower than the reference force $T_{ref}$ at other positions. The pinch detector 120 determines the absolute value of the maximum difference $\Delta T_{max}$ that occurs during the object's travel path, as shown in FIG. 3*b*.

Once the maximum difference $\Delta T_{max}$ has been determined, the pinch detector 120 calculates a threshold update value $\Delta T_{thr}$ according to the following equation $$\Delta T_{thr} = \min(\Delta T_{max}, \text{old}\Delta T_{max} + \delta) \tag{6}$$

As can be seen in Equation 6, $\Delta T_{thr}$ equals the maximum difference $\Delta T_{max}$ as long as the maximum difference $\Delta T_{max}$ changes less than a selected change value δ. This equation recognizes that the maximum difference $\Delta T_{max}$ will become smaller as the reference field moves closer to the actual force profile. The change value δ can be any predetermined amount to allow for, for example, changes in the actual profile due to aging of the object 102. In one embodiment, the initial value of $\Delta T_{thr}$ is set so that $\Delta T_{max}$ will be selected when the $\Delta T_{thr}$ is determined by the pinch detector 120 for the first time. This ensures that the reference field 118 can still be initialized for pinch detection if the original reference field collapses or is otherwise not available.

FIG. 4 shows an example of a relationship between the maximum difference $\Delta T_{max}$ and the additional threshold $\Delta T_{thr}$ calculated from $\Delta T_{max}$. As can be seen in the Figure, a spike 400 in the maximum difference $\Delta T_{max}$ will not change the additional threshold $\Delta T_{thr}$ to the same extent as the spike 400 because the change in the additional threshold $\Delta T_{thr}$ is limited to the change value δ. As a result, $\Delta T_{thr}$ will exhibit gradual change even if $\Delta T_{max}$ changes more abruptly. The new pinching threshold value Tthr is then updated (block 212) according to the following equation:

$$T_{thr} = T_{thr0} + \Delta T_{thr}(\Delta T_{max}) \tag{7}$$

where $T_{thr0}$ is the base threshold value and $\Delta T_{thr}$ is the additional threshold value determined from the maximum difference $\Delta T_{max}$, as explained above.

The additional threshold value is also used to calculated a desired motor speed (block 214) according to the following equation $$\omega^* = \omega_0^* - \beta \Delta T_{thr} \tag{8}$$

where $\omega_0$ is a nominal desired speed and β is a proportional factor that causes the desired speed to become proportionally smaller as the additional threshold $\Delta T_{thr}$ becomes larger. The proportional factor β can be determined through experimentation or through any other known method. Regardless of the specific value for the proportional factor β, the factor β varies the effect of the additional threshold value $\Delta T_{thr}$ on the desired speed so that as the additional threshold value $\Delta T_{thr}$ becomes larger, the desired speed ω* becomes proportionally smaller. By varying the speed of the motor 104 moving the object 102, the pinching force remains constant regardless of the pinching threshold value $T_{thr}$. In one embodiment, the initial speed $\omega_0$ and the base threshold value $T_{thr0}$ are stored in a memory (e.g., in the pinch detector 120) so that they can be used, in conjunction with the initial value of $\Delta T_{thr}=\Delta T_{max}$, for pinch detection if the original reference field collapses or is otherwise not available.

Once the desired speed has been updated (block 214), the process may return back to comparing the actual force with the reference force (block 202) to monitor the movement of the object 102 at its next position and continue pinch detection as the object 102 travels along its path.

As a result, the inventive system and method updates the reference field quickly and optimizes the pinching threshold value $T_{thr}$ based on the updated reference field, thereby preventing false detections of pinching conditions while still minimizing the pinching force. Further, the invention varies the motor speed, and therefore the speed of the object 102, based on the pinch threshold value to keep the pinching force constant regardless of the pinch threshold value. Also, as noted above, storing an initial nominal desired speed and base threshold value and setting the additional threshold difference to be the maximum difference between the reference force and the actual force allows pinch detection even if the reference field 118 is rendered unavailable for any reason.

It should be understood that various alternatives to the embodiments of the invention described herein may be employed in practicing the invention. It is intended that the following claims define the scope of the invention and that the method and apparatus within the scope of these claims and their equivalents be covered thereby.

We claim:

1. A system that detects a pinch condition for a moving object, comprising:

a motor that controls movement of the object;

a pinch detector that determines a difference between an actual force and a reference force, wherein the pinch detector indicates a pinch condition if the difference exceeds a pinch detection threshold; and a motor regulator that changes operation of the motor if the pinch detector indicates a pinch condition, wherein at least one of the pinch detection threshold, the reference force, and a desired motor speed is updated based on the difference between the actual force and the reference force.

wherein the actual force is a value in a force profile having a plurality of actual force values and the reference force is a value in a reference field having a plurality of reference force values.

2. The system af claim 1, wherein the object is at least one selected from the group consisting of a vehicle door, a vehicle window, a sliding door, a trunk, and a lift gate.

3. The system of claim 1, wherein the pinch detector indicates the pinch condition by setting a pinch detection flag, and wherein the motor regulator reverses the motor if the pinch detection flag is set.

4. The system of claim 1, wherein the pinch detector calculates the pinch threshold based on a maximum difference between the actual force values in the force profile and the reference force values in the reference field.

5. The system of claim 4, wherein the pinch threshold is updated by calculating an additional threshold value from the maximum difference.

6. The system of claim 5, wherein the additional threshold value is set equal to the maximum difference when a change in the maximum difference is less than a selected change value, and wherein the additional threshold value is set equal to the maximum difference plus the selected change value if the change in the maximum difference is greater than the selected change value.

7. The system of claim 5, wherein the desired speed is updated by adding a nominal desired speed to the additional threshold value multiplied by a proportional factor.

8. The system of claim 7, wherein the proportional factor is varied to reduce the desired speed as the additional threshold value increases to keep a pinching force of the system constant.

9. The system of claim 1, wherein the reference force is updated by adding together the reference force and a value proportional to the difference between the actual force and the reference force.

10. The system of claim 1, further comprising:

a speed sensor that detects a motor speed;

a voltage sensor that measures a voltage across the motor; and a force calculator coupled to the voltage sensor and the speed sensor, wherein the force calculator calculates the actual force from the voltage across the motor and the motor speed.

11. The system of claim 1, further comprising at least one memory location that stores initial values of the pinch detection threshold, the reference force, and the desired motor speed.

12. A system that detects a pinch condition for a moving object, comprising:

a motor that controls movement of the object;

a speed sensor that detects a motor speed;

a voltage sensor that measures a voltage across the motor;

a force calculator that determines the actual force from the voltage across the motor and the motor speed, wherein the actual force is a value in a force profile having a plurality of actual force values corresponding to a plurality of object positions;

a reference field having a plurality of reference force values corresponding to the plurality of object positions;

a pinch detector that determines a difference between an actual force calculated from the motor speed with a reference force from the reference field, wherein the pinch detector sets a pinch detection flag if the difference exceeds a pinch detection threshold; and a motor regulator that reverses the motor if the pinch detection flag is set, wherein at least one of the pinch detection threshold, the reference field, and a desired motor speed is updated based on the difference between the actual force and the reference force, wherein the pinch threshold is updated by calculating an additional threshold value from a maximum difference between the actual force values in the force profile and the reference force values in the reference field, the desired speed is updated by adding a nominal desired speed to the additional threshold value multiplied by a proportional factor, and the reference field is updated by adding together the reference force and a value proportional to the difference between the actual force and the reference force.

13. The system of claim 12, wherein the object is at least one selected from the group consisting of a vehicle door, a vehicle window, a sliding door, a trunk, and a lift gate.

14. The system of claim 12, wherein the additional threshold value is set equal to the maximum difference when a change in the maximum difference is less than a selected change value, and wherein the additional threshold value is set equal to the maximum difference plus the selected change value if the change in the maximum difference is greater than the selected change value.

15. The system of claim 12, wherein the proportional factor is varied to reduce the desired speed as the additional threshold value increases to keep a pinching force of the system constant.

16. The system of claim 12, further comprising at least one memory location that stores initial values of the pinch detection threshold, the reference field, and the desired motor speed.

17. A method for detecting a pinch condition for an object moved by a motor, comprising:

calculating a difference between an actual force applied by the motor and a reference force;

setting a pinch detection flag if the difference exceeds a pinch detection threshold;

changing operation of the motor if the pinch detection flag is set; and updating at least one of the pinch detection threshold, the reference force, and a desired motor speed based on the difference between the actual force and the reference force, wherein the actual force is a value in a force profile having a plurality of actual force values and the reference force is a value in a reference field having a plurality of reference force values, and wherein the pinch threshold is updated based on a maximum difference between the actual force values in the force profile and the reference force values in the reference field.

18. The method of claim 17, wherein calculating the actual force comprises:

measuring a speed of the motor;

measuring the voltage across the motor; and calculating the actual force from the measured speed and voltage.

19. The method of claim 17, wherein the act of updating includes calculating an additional threshold value from the maximum difference.

20. The method of claim 19, wherein the updating act sets the additional threshold value equal to the maximum difference when a change in the maximum difference is less than a selected change value, and wherein the updating act sets the additional threshold value equal to the maximum difference plus the selected change value if the change in the maximum difference is greater than the selected change value.

21. The method of claim 19, wherein the act of updating the desired speed includes adding a nominal desired speed and the additional threshold value multiplied by a proportional factor.

22. The method of claim 21, further comprising varying the proportional factor to reduce the desired speed as the additional threshold value increases to keep a pinching force of the system constant.

23. The method of claim 17, wherein the act of updating the reference force includes adding together the reference force and a value proportional to the difference between the actual force and the reference force.

* * * * *